(12) United States Patent
Scotten

(10) Patent No.: US 8,050,781 B2
(45) Date of Patent: Nov. 1, 2011

(54) SYSTEMS AND METHODS FOR ASIC POWER CONSUMPTION REDUCTION

(75) Inventor: Jeffrey Douglas Scotten, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 107 days.

(21) Appl. No.: 11/824,348

(22) Filed: Jun. 29, 2007

(65) Prior Publication Data

US 2009/0001960 A1 Jan. 1, 2009

(51) Int. Cl.
*G05B 11/01* (2006.01)
*G06F 19/00* (2011.01)
*G06F 1/00* (2006.01)
*G06F 1/26* (2006.01)
*G01P 21/00* (2006.01)
*G04F 1/00* (2006.01)

(52) U.S. Cl. ......... 700/71; 700/126; 713/300; 713/320; 702/96; 702/107; 702/176

(58) Field of Classification Search ............ 700/71, 700/126; 713/320, 300; 702/96, 107, 176
See application file for complete search history.

(56) References Cited

U.S. PATENT DOCUMENTS

| | | | | |
|---|---|---|---|---|
| 4,375,614 A | * | 3/1983 | Steiner | 323/280 |
| 5,461,649 A | * | 10/1995 | Bailey et al. | 327/28 |
| 5,920,708 A | * | 7/1999 | Gates et al. | 710/305 |
| 6,075,389 A | * | 6/2000 | Umemoto et al. | 327/49 |
| 6,366,157 B1 | * | 4/2002 | Abdesselem et al. | 327/535 |
| 6,381,688 B1 | * | 4/2002 | Gates et al. | 712/32 |
| 7,036,029 B2 | * | 4/2006 | May et al. | 713/320 |
| 7,075,276 B2 | * | 7/2006 | Morales | 323/246 |
| 7,137,017 B2 | * | 11/2006 | Itoh | 713/322 |
| 2002/0120878 A1 | * | 8/2002 | Lapidus | 713/300 |
| 2004/0199821 A1 | * | 10/2004 | Flautner et al. | 714/30 |
| 2004/0268165 A1 | * | 12/2004 | May et al. | 713/320 |
| 2005/0001600 A1 | * | 1/2005 | Morales | 323/282 |
| 2005/0229056 A1 | * | 10/2005 | Rohrbaugh et al. | 714/726 |
| 2006/0071657 A1 | * | 4/2006 | Emmert et al. | 324/160 |
| 2006/0076973 A1 | * | 4/2006 | Furukawa | 324/769 |
| 2007/0057715 A1 | * | 3/2007 | Yeh et al. | 327/261 |
| 2007/0214377 A1 | * | 9/2007 | Jarrar et al. | 713/401 |
| 2007/0220388 A1 | * | 9/2007 | Quereshi et al. | 714/731 |

* cited by examiner

*Primary Examiner* — Albert DeCady
*Assistant Examiner* — Jason Lin
(74) *Attorney, Agent, or Firm* — Morrison & Foerster LLP

(57) ABSTRACT

Embodiments of the present invention are directed to dynamically measuring the speed of a circuit and modifying the operating voltage of the circuit based on the measured speed, in order to minimize the power being used while still ensuring proper operation of the circuit. Consequently, circuits of higher inherent speeds may have their voltages decreased (thus decreasing their actual speeds), while circuits of lower speeds may have their voltages increased, or kept the same. Thus, the resulting speeds of all circuits may be kept within a limited range to ensure proper operation. In addition, the power dissipated of circuits of higher speeds may be decreased.

17 Claims, 4 Drawing Sheets

SYSTEMS AND METHODS FOR ASIC POWER CONSUMPTION REDUCTION

FIELD OF THE INVENTION

Embodiments of this invention generally relate to powering integrated circuits and more specifically to controlling the power delivered to integrated circuits to improve efficiency and reduce power dissipation.

BACKGROUND OF THE INVENTION

Power management is an important field in modern electronics. It is usually desirable to ensure low power consumption for electronic devices in general and integrated circuits (ICs) in particular because low power usage promotes increased efficiency and reduces heat dissipation.

For most existing silicon based circuits, it is usually the case that given a specific circuit, increasing the operating voltage of the circuit will result in increased power consumption.

An important characteristic of circuits or portions of circuits is their speed. The speed of a circuit is related to the time it takes for the circuit to produce a stable and correct output signal after being provided with stable input signals. Speed is a significant characteristic, because faster circuits allow for higher clock frequencies (or alternatively, for more processing to be performed without intermediate latching), and thus generally improve the performance of larger integrated circuits. Speed may depend on the operating voltage of the circuit. Usually, higher voltages result in higher speeds. It should be noted that as used herein, the term speed differs from the term clock speed.

Therefore, while it may be desirable to decrease the operating voltage of a circuit in order to decrease the power it uses, this may be detrimental as it may slow the circuit down. If the circuit is slowed down to the point where stable signals cannot be produced in time to be latched, then the entire circuit may fail as the result of reduced voltage (or alternatively, the circuit's clock speed may need to be decreased). Thus, for many existing circuits, voltages are kept well within predefined safe tolerances in order to ensure that the circuit is fast enough for normal operation under various environmental conditions. This often results in relatively high voltage, which in turn results in relatively high power requirements.

Some existing circuits use high level information about the operations a circuit is about to perform in order to control the voltage of the circuit. For example, it may be known that a CPU may be able to perform certain simple operations (or a low number of operations) at a lower speed (and thus at a lower voltage). Thus, the CPU may determine whether the upcoming operations it is about to perform may allow it to operate at a lower speed and decrease its voltage accordingly. Chips produced by Transmeta Corporation of Santa Clara, USA may utilize similar technology.

SUMMARY OF THE INVENTION

Embodiments of the present invention are directed to dynamically measuring the speed of a circuit and modifying the operating voltage of the circuit based on the measured speed, in order to minimize the power being used while still ensuring proper operation of the circuit. Consequently, circuits of higher inherent speeds may have their voltages decreased (thus decreasing their actual speeds), while circuits of lower speeds may have their voltages increased, or kept the same. Thus, the resulting speeds of all circuits may be kept within a limited range to ensure proper operation. In addition, the power dissipated of circuits of higher speeds may be decreased.

This may result in a predictable controlled speed of the integrated circuit, which can improve the dependability of that circuit. Furthermore, if the integrated circuit has high inherent speed, its voltage will be decreased, ensuring lower power consumption of the integrated circuit.

DETAILED DESCRIPTION OF THE PREFERRED EMBODIMENTS

Figure 1:
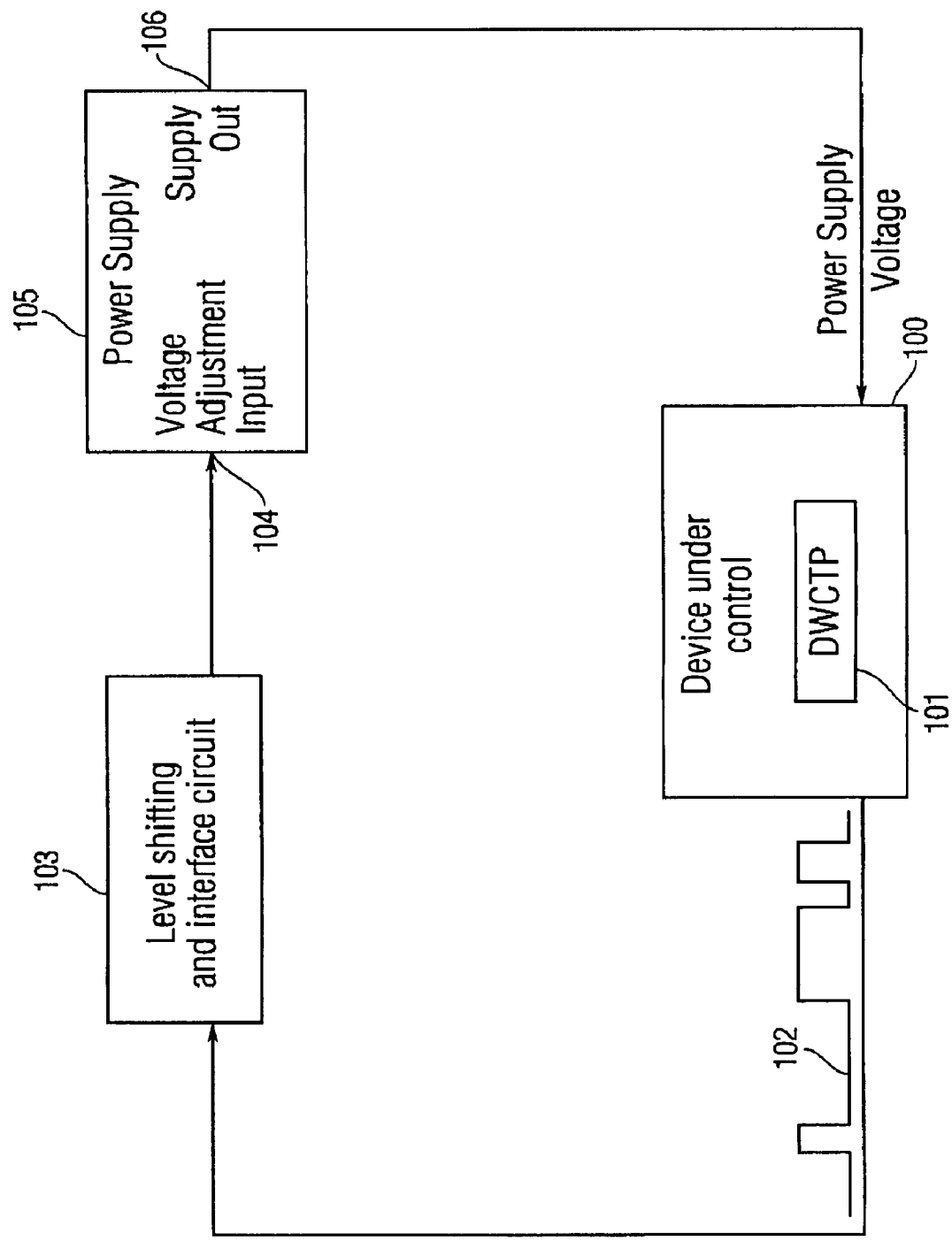
FIG. 1 is a diagram of an exemplary embodiment of the invention.

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of CMOS based circuits, it should be understood that the present invention is not limited to such circuits, but is generally applicable to any electronic circuits.

Speed, as discussed above, may depend on voltage. However, it may also depend on the physical characteristics of the circuit materials. For example, certain types of doped silicon may allow for a higher degree of conductivity in their conductive states, and thus improve the speed of a circuit made of them. Furthermore, speed may depend on the temperature of the device (higher temperature usually allows higher speed), on clock jitter (higher jitter results in lower allowed speeds), and on electromagnetic noise (again, higher noise usually results in lower allowed speed). In most cases, of the above listed speed influencing factors, one can be practicably and predictably controlled by the circuit itself—the supply voltage (while a circuit can technically control the temperature by turning a fan off and on, this type of control is usually not predictable). Thus, the component of the speed of a circuit which does not depend on a voltage may be referred to as inherent speed. Thus, if several circuits are held at the same voltage, their relative speeds will depend on the relative values of their inherent speeds.

Because even the most advanced currently known circuit manufacturing methods cannot produce two pieces of material having exactly the same chemical composition, the inherent speeds of different circuits may differ even if the circuits are exactly of the same design and manufactured by the same facility and by the same process. In other words, because no two silicon wafers are exactly the same, circuits manufactured from different wafers may have different inherent speeds. In some cases, circuits manufactured from the same wafer, or even different portions of the same circuit may have different inherent speeds, as different areas of a single wafer may have different chemical compositions. Furthermore, since the operating environment of a device (e.g., temperature, noise) may differ during different times of operation, even a single device may feature different inherent speeds at different times of operation.

Circuits of higher inherent speeds, while faster, usually require more power than similar circuits of lower inherent speeds driven at the same voltage.

In traditional circuit design, possible variations of the inherent speeds of various circuits are taken into account when designing the circuits. Thus, it must be ensured that even inherently slow circuits are able to produce stable results in time for these results to be latched. This is often done by decreasing the clock frequency or changing the circuit design. Occasionally, a small increase of the voltage may also be used to increase a circuit's speed. Both the increase in voltage and the reduction in clock frequency measures are detrimental to overall performance—a decreased clock speed decreases processing performance, while increased voltage increases the power. Traditional circuits are manufactured so that all circuits of a single design that pass certain quality control screenings operate in the same fashion regardless of possible differences of inherent speed. Therefore, the operating parameters (e.g., clock frequency) are selected so that the slowest circuits may operate properly. Thus, the potential benefits of circuits of higher inherent speeds are not utilized. In other words, circuits of higher speeds may reach stability of their signal faster, but since the clock rate is configured to accommodate the circuits of slower inherent speeds, reaching stability faster will not result in higher performance.

Moreover, because circuits of higher speed draw more power at the same voltage than circuits of lower speed, having a higher speed is often a detriment for many traditional circuits because of increased power dissipation.

Embodiments of the present invention are directed to dynamically measuring the speed of a circuit and modifying the operating voltage of the circuit based on the measured speed, in order to minimize the power being used while still ensuring proper operation of the circuit. Consequently, circuits of higher inherent speeds may have their voltages decreased (thus decreasing their actual speeds), while circuits of lower speeds may have their voltages increased, or kept the same. Thus, the resulting speeds of all circuits may be kept within a limited range to ensure proper operation. In addition, the power dissipated of circuits of higher speeds may be decreased.

In general, a particular voltage may be considered safe for a given inherent speed of a circuit, if a circuit of that inherent speed operates in such a manner when powered by the voltage that all its signals reach stability before they are latched. In other words, a voltage is safe for an inherent speed of a circuit if it does not cause a circuit of that inherent speed to generate timing errors. As discussed above, circuits of higher inherent speeds may have lower safe voltages than circuits of lower inherent speeds. In other words, an inherently faster circuit may be able to tolerate a decrease in the voltage without causing timing errors.

FIG. 1 shows an exemplary embodiment of the present invention. An integrated circuit 100 may be a device at which an embodiment of the present invention is implemented. The integrated circuit may include a designed worst case timing path (DWCTP) circuit 101 embedded therein. The DWCTP circuit is a circuit used to measure the speed of the integrated circuit 100.

The DWCTP circuit may output a signal 102 indicative of the speed of the integrated circuit 100. A level shifting and interface circuit 103 may process that signal in order to place it in format suitable for a power supply. The processed signal may be sent to a voltage adjustment input 104 of power supply 105. The power supply may supply a driving voltage from a supply output 106 to the integrated circuit 100. The power supply may modify the voltage being supplied based on the signal received at voltage adjustment input. The voltage adjustment input signal itself is based on the speed of the integrated chip. Thus, the power supply may modify the driven voltage based on the speed of the integrated circuit. For example, the power supply may decrease the voltage if the speed is higher than a predefined desired value, and increase it when the speed is lower than the predefined desired value. When the power supply changes the voltage, the speed of the integrated circuit 100 changes, which results in changes to the signal 102 produced by the DWCTP circuit. This may result in further changes in the power supply voltage, and so on. Thus, a feedback loop may be established and used to change the voltage until the speed of the integrated circuit is at the desired value.

This may result in a predictable controlled speed of the integrated circuit, which can improve the dependability of that circuit. Furthermore, if the integrated circuit has high inherent speed, its voltage will be decreased, ensuring lower power consumption of the integrated circuit.

Figure 2:
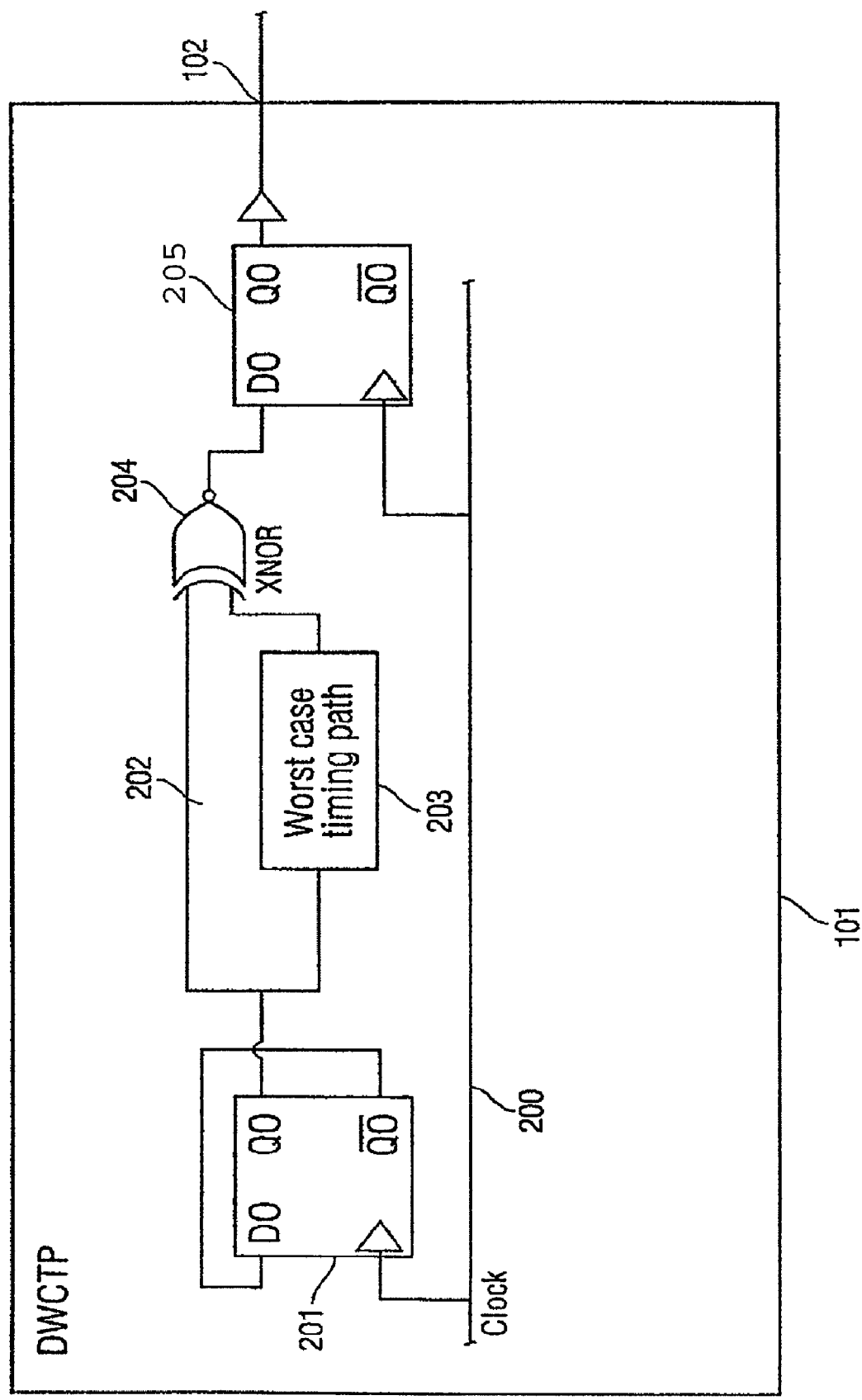
FIG. 2 is a diagram of an exemplary DWCTP circuit.

FIG. 2 shows an exemplary DWCTP circuit in more detail. A clock 200 is connected to flip-flops 201 and 205. In one embodiment, the flip-flops latch their values on the rise of the clock signal. The inverting output of flip-flop 201 is connected to its input. This may cause the non-inverting output to output a square wave of a frequency twice as low as that of the clock.

The non-inverting output of flip-flop 201 is connected to two paths. The first path is an uninterrupted conductor 202. The second path is a worst case timing path 203. The worst case timing path comprises a plurality of electronic elements (e.g., resistors, transistors, capacitors, etc) intended to provide a delay which may be measured in order to measure the overall speed of the integrated circuit. The worst case timing path may not include any logic that is actually used by the integrated circuit to perform its primary function. Instead, it may be provided solely for the purposes of measuring the integrated circuit's speed. The logic of the worst case timing path is configured so that it provides a delay longer than the slowest path that of the rest of the circuitry of the integrated circuit 100. Furthermore, the worst case timing path may be such that it outputs the same signal it receives from the flip-flop 201.

Usually, during the design of integrated circuits (including ICs that do not implement the present invention), the logic paths within the IC are examined to determine which one is the slowest. For this purpose, a path may be defined as a sequence of logic elements positioned between two latches or other memory elements. Integrated circuits are usually designed so that the slowest path is faster than the clock cycle. Thus, it may be ensured that all latches and other memory will always be able to store a stable signal at each clock cycle.

As noted above, the worst case timing path is designed to be slower than the slowest timing path of the rest of the IC discussed above. Furthermore, the worst case timing path is designed to be slower by a sufficient tolerance margin. The tolerance margin may be different for each circuit.

The two paths 202 and 203 connect to an exclusive NOR gate 204. The exclusive NOR gate provides a high signal if its inputs are of the same values and a low signal if they are not. Path 202 passes the signal obtained from flip-flop 201 with relatively little delay (being an uninterrupted wire). Path 203, on the other hand, may cause significant delay. Whether the inputs of gate 204 are the same depends upon the difference between the delays of paths 202 and 203. If the delay of path 203 is longer than that of path 202 by a whole clock cycle or more, then the signals at gate 204 may be different and the gate may produce a low signal. Otherwise, if the delay of path 203 is longer than that of path 202 by less than a clock cycle, the output at gate 204 may be high. The output of gate 204 is latched at latch 202 and is provided by that latch to elements external to the integrated circuit as output signal 102.

A person of skill in the art would recognize that the DWCTP circuit provides a high value if the integrated circuit is faster than a threshold value and a low value if the integrated circuit is slower than the threshold value. The threshold value depends on the length of the worst case timing path and the current clock speed. Signal 102 may be thought of as an error signal indicating an error (low value) when the worst case timing path is slower than a single clock cycle.

At first glance, it may seem that the DWCTP circuit provides only a binary value (i.e., as to whether the speed of the circuit exceeds or does not exceed a threshold speed), and that a binary value may be of limited usefulness for precisely controlling the voltage.

However, due to the inherent randomness present in all circuits, when the speed of the IC is close to the threshold value, the output 102 of the DWCTP circuit will vary between high and low. Thus, even if the speed of the IC is lower than the threshold value (which would under ideal conditions result in a signal that is always '0'), in reality, due to randomness, the signal 102 may be at '1' at some times. Thus, the speed of the integrated circuit, when close to the threshold value, may be statistically determined by averaging the output signal. If the speed is at the threshold value the average should be at the middle (0.5). In other words, there should be as many '1's as '0's in the signal 102. If the speed goes higher or lower, the average may increase or decrease accordingly.

Thus, a more granular multi-value signal may be obtained by statistically processing the binary signal 102. It should be noted that the above described method of measurement provides that at some times the output signal 102 may be '0'. Thus, at some times, the worst case timing path may be longer than the clock cycle. This is not detrimental because the worst case timing path serves no useful function other than measuring the overall speed of the integrated circuit 100. However, in order for the IC 100 to operate properly, all other paths of the rest of the circuits of the IC should be faster than the clock cycle. Otherwise, errors, or undefined signals may be produced. Therefore, as discussed above, the worst case timing path should be sufficiently slower than the slowest path in the rest of the IC circuitry, so that no other path in the rest of the IC circuitry becomes longer than a clock cycle during the voltage determination process discussed herein.

As noted above, the worst case timing path may in fact cause timing errors (e.g., it may not provide a stable signal when flip-flop 205 latches. However, since these errors are actually used to measure speed, they are not considered "true" errors. In other words, even if the worst case timing path causes timing errors, the circuit may be considered to be operating without timing errors. Thus a timing error of the worst case timing path need not actually indicate that a particular voltage is unsafe for the circuit. For this purpose, the worst case timing path and the rest of the DWCTP circuit may be considered to be different than the rest of the integrated circuit 100. The rest of the integrated circuit can be considered to include a plurality of general purpose portions for which it is critical that the timing is such that all signals are stabilized before they are latched. In the other hand, the DWCTP circuit may be a non-general purpose circuit which may allow unstable signals for the purposes of testing the overall speed of the integrated circuit as discussed above.

Figure 3:
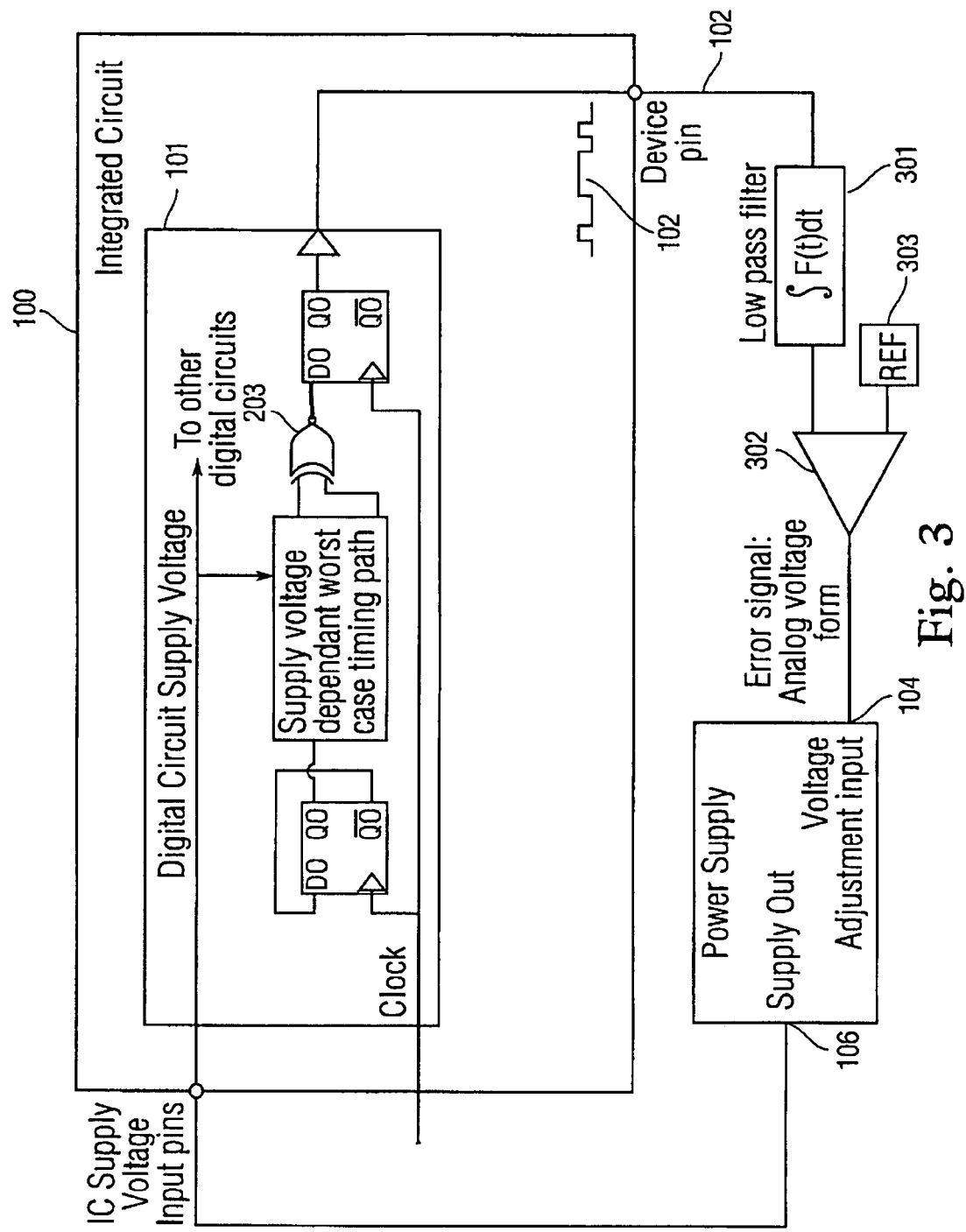
FIG. 3 is a more detailed diagram of an exemplary embodiment of the invention.

FIG. 3 is a more detailed diagram of an exemplary embodiment of the invention. The signal 102 may vary between high and low values depending on the speed of the integrated circuit as compared to a threshold speed. This signal may be fed into an integrator (or low pass filter) 301. The integrator may provide a signal indicative of the average value of signal 301. This value may be compared to a reference value provided by reference circuit 303 by comparator 302. The reference value may be, for example, 0.5. The comparison between the average value and the reference value may result in a signal 304 that is used to control the power supply. The comparator may also invert the resulting signal, so that higher incoming signals from integrator 301 indicating higher speeds result in lower signals 304 being sent to the power supply. Thus, the power supply may be controlled to reduce the voltage when the speed is high. In some embodiments, the comparator may not be a binary digital comparator, but a comparator that outputs a difference of the input signals.

Thus, the power supply is controlled by a signal indicative of the overall speed of the integrated circuit as measured by DWCTP circuit 101. The voltage provided by the power supply may depend on that speed. The voltage provided by the power supply may power the worst case timing circuit and thus may further affect its speed. This may result in the feedback functionality loop discussed above. Eventually, through the feedback loop, the voltage produced by the power supply and the resulting speed of the integrated circuit may stabilize.

The stabilized speed of the system may depend on the threshold voltage of the DWCTP (discussed above) and the reference value provided by circuit 303. An additional advantage may be that according to the above discussed embodiment, the voltage determination process may run continuously during operation of the IC 100. Therefore, if environmental conditions (e.g., temperature) change the inherent speed of the IC, then the above discussed system may dynamically readjust the voltage. Thus, for example, if the temperature increases, resulting in higher speed, the present system may automatically decrease the voltage to compensate. More specifically, as a result of the higher temperature, the worst case timing path 203 may become faster, which may cause signal 102 to be high for longer periods of time, which may increase the average and the signal output by the comparator, which may cause the power supply to decrease the voltage.

Some existing power supplies may provide a voltage adjustment input 104. Other, more standard power supplies may lack such input. However, even the standard power supplies usually include a feedback circuit. Thus, the input 104 may be realized by tapping into the feedback circuit.

In an alternative embodiment, an integrated circuit may include multiple DWCTP circuits placed at different areas of the integrated circuit. The signals provided by the multiple DWCTP circuits may be added (or averaged) and used to control the power supply. Thus, variations of speed between different portions of the IC may be taken into account when controlling the voltage.

In other embodiments, the integrator 301 and comparator 302 may be digital circuits. Similarly the power supply may be controlled by a digital voltage adjustment input. Other embodiments may use entirely different methods of measuring the speed of the integrated circuit 100.

Figure 4:
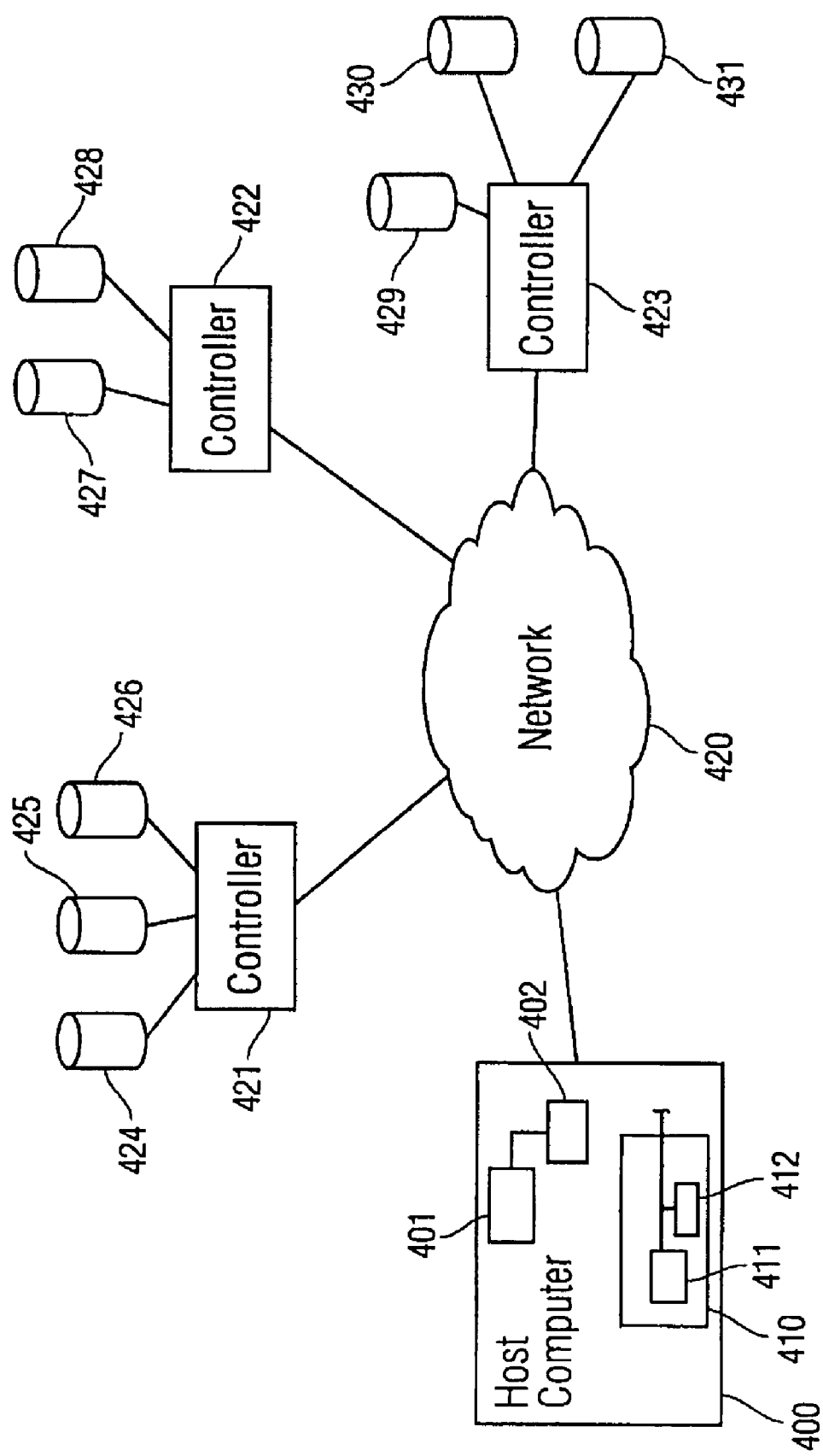
FIG. 4 is a diagram of an exemplary storage area network according to embodiments of the invention.

FIG. 4 is a diagram of exemplary embodiments of the present invention. A host computer 400 may be provided. The host computer may include a processor 401 and memory 402. The memory may include host software. The host computer can also include an HBA 410. The HBA may include an embedded processor 411 and HBA memory 412. The HBA memory may also include software such as, for example, HBA firmware. The present invention can be implemented at the HBA in order to improve the power usage of the HBA processor and/or the HBA memory. Thus, integrated circuit 100 may be an integrated circuit that includes the HBA processor, the HBA memory or both. The present invention may also be implemented at the host computer in order to improve power usage of the host processor, or the host memory. Alternatively, the invention can be implemented both at the host computer and the HBA.

The host computer 400 can have various different functions. In one embodiment, the host computer may be a part of a storage area network (SAN). The SAN can include a network component 420, a plurality of controllers 421-423, and a plurality of disc drives 424-431 connected to the various controllers. The controller may include HBAs similar to HBA 410. Thus, the HBAs of the controllers may also feature the improved power management systems and methods discussed herein.

In general, embodiments of the present invention may be implemented for any integrated circuit for which efficient power management is considered an important goal.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An electronic device comprising:
a power supply;
an integrated circuit connected to the power supply, the integrated circuit comprising an internal speed measuring circuit that includes:
first and second timing paths,
an input signal generator and an output signal generator driven by a common clock signal with a clock cycle,
the input signal generator connected to an input end of the first timing path and to an input end of the second timing path,
the output signal generator being configured to output a first signal based upon a determination whether a delay difference between said first and second timing paths is greater than the clock cycle, the first signal indicating a current speed of the integrated circuit;
a power supply control circuit external to the integrated circuit and connected to the internal speed measuring circuit of the integrated circuit and to the power supply, the power supply control circuit being configured to
receive the first signal from the internal speed measuring circuit; and
generate a voltage control signal based on the first signal and send the voltage control signal to the power supply,
wherein the power supply is configured to modify a supply voltage to the integrated circuit based on the voltage control signal.

2. The electronic device of claim 1, wherein the power supply control circuit is configured to generate a voltage control signal operative to cause the power supply to generate a supply voltage which causes the integrated circuit to have a speed within a predefined target speed range.

3. The electronic device of claim 2, wherein the predefined target speed range is such that all general purpose portions of the circuit are fast enough to provide stable results before latching.

4. The electronic device of claim 1, further comprising
a plurality of integrated circuits of a first design including the integrated circuit that is also of the first design, each of the plurality of integrated circuits of the first design featuring a respective inherent speed,
wherein the power supply is configured to begin operation at a predefined initial voltage, the initial voltage being determined to be safe for all inherent speeds for all integrated circuits of the plurality of integrated circuits, and
the power supply control circuit is configured to cause the power supply to decrease the initial voltage to an efficient voltage level, the efficient voltage level being safe for the inherent speed of the integrated circuit and being generated based on the first signal.

5. The electronic device of claim 1, wherein the internal speed measuring circuit is a designed worst case timing path circuit.

6. The electronic device of claim 5, wherein the first and second timing paths include a worst case timing path, the worst case timing path being such that it requires more time for a signal to propagate through the worst case timing path than any other path between latches within the integrated circuit.

7. The electronic device of claim 6, wherein the first signal is an error signal indicating whether a signal can propagate through the worst case timing path in a clock cycle.

8. The electronic device of claim 7, wherein the power supply control circuit includes an integrator configured to integrate the error signal in order to generate a second signal indicative of a current frequency of the error signal over a predefined period of time, and a comparator configured to compare the second signal with a predefined reference signal, the voltage control signal being based on the result of the comparison between the second signal and the reference signal.

9. The electronic device of claim 1, wherein the electronic device is a computer and the integrated circuit is a processor of the computer.

10. The electronic device of claim 1, wherein the electronic device is a host bus adapter and the integrated circuit includes a processor of the host bus adapter.

11. A storage area network including the host bus adapter of claim 10.

12. The electronic device of claim 1, wherein the internal speed measuring circuit further comprises:
a logic gate with a first input connected to an output end of the first timing path and a second input connected to an output end of the second timing path; and
the output signal generator connected to an output of the logic gate.

13. The electronic device of claim 12, wherein:
the input signal generator and the output signal generator are flip-flops.

14. The electronic device of claim 1, wherein the internal speed measuring circuit further comprises:
an exclusive NOR gate with a first input connected to an output end of the first timing path and a second input connected to an output end of the second timing path.

15. A method for efficiently operating an electronic circuit comprising:

connecting an integrated circuit to a power supply, the integrated circuit comprising an internal speed measuring circuit that includes:
first and second timing paths,
an input signal generator and an output signal generator driven by a common clock signal with a clock cycle,
the input signal generator connected to an input end of the first timing path and to an input end of the second timing path,
the output signal generator configured to output a first signal based upon a determination whether a delay difference between said first and second timing paths is greater that a the clock cycle, the first signal indicating a current speed of the integrated circuit; and
connecting a power supply control circuit to the internal speed measuring circuit and to the power supply, wherein the power supply control circuit is external to the integrated circuit and configured to receive the first signal from the internal speed measuring circuit, generate a voltage control signal based on the first signal and send the voltage control signal to the power supply, wherein the power supply is configured to modify a supply voltage to the integrated circuit based on the voltage control signal.

16. The method of claim 15, wherein the first and second timing paths include a worst timing path through which an amount of time for a signal to propagate is longer than that of any other path between latches within the integrated circuit.

17. A method of measuring an integrated circuit speed comprising:
driving an input signal generator and an output signal generator by a common clock signal with a clock cycle;
simultaneously sending a signal from the input signal generator through a first timing path and a second timing path of a speed measuring circuit in an integrated circuit, wherein the first and second timing paths include a worst timing path through which an amount of time for the signal to propagate is longer than that of any other path between latches within the integrated circuit;
determining whether a delay difference between said first and second paths is greater than the clock cycle; and
based on the determination, generating a speed signal from the output signal generator indicating a current speed of the integrated circuit.

* * * * *